United States Patent [19]
Kim et al.

[11] Patent Number: 6,088,078
[45] Date of Patent: Jul. 11, 2000

[54] LIQUID CRYSTAL DISPLAY WITH HORIZONTAL ELECTRIC FIELD

[75] Inventors: Hyang Yul Kim; Seung Hee Lee, both of Kyoungki-do, Rep. of Korea

[73] Assignee: Hyundai Electronics Industries Co., Ltd., Kyoungki-do, Rep. of Korea

[21] Appl. No.: 09/203,945

[22] Filed: Dec. 2, 1998

[30] Foreign Application Priority Data

Dec. 3, 1997 [KR] Rep. of Korea .................... 97-65588

[51] Int. Cl.$^7$ ................................................ G02F 1/1343
[52] U.S. Cl. ........................................... 349/141; 349/144
[58] Field of Search ............................. 349/43, 141, 143, 349/144

[56] References Cited

U.S. PATENT DOCUMENTS

| | | | |
|---|---|---|---|
| 5,499,130 | 3/1996 | Okada | 359/87 |
| 5,528,402 | 6/1996 | Parker | 359/87 |
| 5,576,862 | 11/1996 | Sugiyama et al. | 359/75 |
| 5,745,207 | 4/1998 | Asada et al. | 349/145 |
| 5,793,459 | 8/1998 | Toko | 349/128 |
| 5,946,066 | 8/1999 | Lee et al. | 349/141 |
| 5,959,708 | 9/1999 | Lee et al. | 349/141 |

FOREIGN PATENT DOCUMENTS 10-90730 4/1998 Japan .
10-170920 6/1998 Japan .

*Primary Examiner*—James A. Dudek
*Attorney, Agent, or Firm*—Ladas & Parry

[57] ABSTRACT

The present invention provides an LCD device preventing color shift and enhancing the picture resolution, comprising: a first substrate comprising of a plurality of data bus lines which are parallel each other; a plurality of gate bus lines disposed parallel to form matrix type unit cells; a plurality of thin film transistors disposed at the intersections of the data bus lines and the gate bus lines, each disposed at each unit cell; and a pixel electrode connected to each of thin film transistor and a counter electrode are formed in each unit cells of the first substrate; a second substrate oppositely disposed to the first substrate with a predetermined distance; a liquid crystal layer including a plurality of liquid crystal molecules sandwiched between the first and second substrates; and polarizing plates attached to outer surfaces of the first substrate and the second substrate respectively; wherein each of unit cells defined by the adjacent two bus lines of the plurality of bus lines and the adjacent two scanning lines of the plurality of gate lines is divided into a plurality of electric field forming regions; and wherein the electric field formed in each electric field forming regions is obliquely formed toward the data bus line and the gate bus line, thereby having a symmetry with adjacent electric field forming region.

14 Claims, 4 Drawing Sheets

LIQUID CRYSTAL DISPLAY WITH HORIZONTAL ELECTRIC FIELD

FIELD OF THE INVENTION

The present invention relates to a liquid crystal display ("LCD"), more particularly to an LCD having an electric field parallel to the substrate thereof.

BACKGROUND OF THE INVENTION

A liquid crystal display of light weight, thin thickness and low power consumption has been used in various information display terminals and visual equipments. The major operating mode for the liquid crystal display is the twisted nematic ("TN") and the super twisted nematic ("STN"). Although they are presently commercially used in various liquid crystal display means, the characteristics of narrow viewing angle are still remained unsolved. An In-Plane Switching ("IPS") mode liquid crystal display has been suggested to solve foregoing problems.

As described in FIG. 1, a plurality of gate bus lines 11 are formed on a lower insulating substrate 10 along an X direction shown in the drawings and they are parallel to each other. A plurality of data bus lines 15 are formed along an Y direction which is substantively orthogonal with the X direction. Therefore a sub pixel region is defined. At this time, a pair of gate bus line 11 and a pair of data bus line 15 are shown for defining the sub pixel region. The gate bus line 11 and the data bus line 15 are insulated by a gate insulating layer(not shown). A counter electrode 12 is formed, for example in a square frame shape, in a sub pixel region. At that time, the counter electrode 12 and the gate bus line 11 are disposed on the same plane. A pixel electrode 14 is formed at each sub pixel region where the counter electrode 12 is formed. The pixel electrode 14 is composed of a web region 14a which divides the region surrounded by the square frame type counter electrode 12 with the Y direction, a first flange region 14b connected to one end portion of the web region 14a and overlapped with the counter electrode 12 of X direction, and a second flange region 14c which is parallel to the first flange region 14b and is connected to another end portion of the web region 14a and overlapped with the counter electrode 12 of the X direction. That is to say, the pixel electrode 14 seems the letter "I". Here, the pixel electrode 14 and the counter electrode 12 are insulated by a gate insulating layer (not shown).

The thin film transistor(hereinafter TFT) 16 is disposed at the intersection of the gate bus line 11 and the data bus line 12. This TFT 16 is composed of a gate electrode being extended from the gate bus line 11, a drain electrode being extended from the data bus line 15, a source electrode being extended from the pixel electrode 14 and a channel layer 17 formed over upper of the gate electrode. A storage capacitor (Cst) is formed in the region where the counter electrode 12 and the pixel electrode 14 are overlapped. Though not shown in FIG. 1, an upper substrate (not shown) including a color filter(not shown) and a lower substrate 10 are oppositely and disposed with a predetermined distance. Further a liquid crystal layer(not shown) having a plurality of liquid crystal molecules is interposed between the upper substrate(not shown) and the lower substrate. Also, onto the resultant structure of the lower substrate and onto an inner surface of the upper substrate are formed homogeneous alignment layers, respectively. Before forming an electric field between the counter electrode 12 and the pixel electrode 14, the long axes of liquid crystal molecules 19 are arranged parallel to the surface of the substrate and therefore the orientation direction of the molecules 19 is decided. The R direction in the drawings is the direction of rubbing axis for the homogeneous alignment layer formed on the lower substrate 10.

A first polarizing plate(not shown) is arranged on the outer surface of the lower substrate 10 and a second polarizing plate(not shown) is formed on the outer surface of the upper substrate(not shown). Here the first polarizing plate is disposed to make its polarizing axis to be parallel to the P direction of the FIG. 1. That means, the rubbing axis direction R and the polarizing axis direction P are parallel each other. On the other hand, the second polarizing plate is disposed to make its polarizing axis to be parallel to the Q direction which is substantially perpendicular to the polarizing axis of the first polarizing axis. When an scanning signal is applied to the gate bus line 11 and a display signal is applied to the data bus line 15, the TFT 16 disposed at the intersection of the gate bus line 11 and the data bus line 15 is turned on. Then the display signal of the data bus line 15 is transmitted to the pixel electrode 14 through the TFT 16. Consequently, an electric field E is generated between the counter electrode 12 inputted a common signal and the pixel electrode 14. At this time, as the direction of electric field is x direction as described in the FIG. 1, it has a predetermined degree of angle with the rubbing axis.

Afterwards, before the electric field is not formed, the long axes of the liquid crystal molecules are arranged parallel to the substrate surface and parallel to the long axis of the rubbing direction R. Therefore the light passed through the first polarizing plate and the liquid crystal layer is unable to pass the second polarizing plate, the screen has dark state. As the electric field is generated, the long axes(or optical axis) of the liquid crystal molecules are rearranged parallel to the electric field, and therefore the incident light passed through the first polarizing plate and the liquid crystal layer passed through the second polarizing plate and the screen has white state. At that time, the direction of the long axes of the liquid crystal molecules as being parallel to the substrate surface becomes changed according to the presence of the electric field. The characteristics of viewing angle are enhanced.

As well known, the refractive anisotropy(or birefringence: $\Delta n$) is occurred due to the difference of the lengths of the long and the short axes. The refractive anisotropy($\Delta n$) is also varied from the observer's viewing directions. Therefore a predetermined color is appeared on the region where the polar angle is of 0 degree and azimuth angle range of degrees 0, 90, 180 and 270 in spite of the white state. This regards as the color shift and more detailed description thereof is attached with reference to the equation (1).

$$T \approx T_0 \sin^2(2\chi) \cdot \sin^2(\pi \cdot \Delta n d / \lambda) \tag{1}$$

wherein, T: transmittance;

$T_0$: transmittance to the reference light;

$\chi$: angle between an optical axis of liquid crystal molecule and a polarizing axis of a polarizer;

$\Delta n$: birefringence;

d: distance or gap between the upper and lower substrates (thickness of the liquid crystal layer); and $\lambda$: wavelength of the incident light.

So as to obtain the maximum transmittance T, the $\chi$ should be $\pi/4$ or the $\Delta nd/\lambda$ should be $\pi/2$ according to the equation (1). As the $\Delta nd$ varies with the birefringence difference of the liquid crystal molecules from viewing directions, the $\lambda$ value is varied in order to make $\Delta nd/\lambda$ to be π/2. According to this, the color corresponding to the varied wavelength λ becomes appeared. Accordingly as the value of Δn relatively decreases in the viewing directions "a" and "c" toward the short axes of the liquid crystal molecules, the wave length of the incident light for obtaining the maximum transmittance relatively decreases. Consequently a blue color having a shorter wavelength than a white color is emerged. On the other hand, as the value of Δn relatively increases in the viewing directions "b" and "d" toward the long axes of the liquid crystal molecules, the wave length of incident light relatively increases. Consequently, a yellow color having a longer length than the white color is emerged. This causes deterioration of the resolution in IPS-LCDs.

SUMMARY OF THE INVENTION

It is an object of the present invention to provide an LCD device preventing color shift and improving the picture quality.

According to an aspect to the present invention, there is a liquid crystal display, includes: a first substrate comprising of a plurality of data bus lines which are parallel each other; a plurality of gate bus lines disposed parallel to form matrix type unit cells; a plurality of thin film transistors disposed at the intersections of the data bus lines and the gate bus lines, each disposed at each unit cell; and a pixel electrode connected to each of thin film transistor and a counter electrode are formed in each unit cells of the first substrate;

a second substrate oppositely disposed to the first substrate with a predetermined distance;

a liquid crystal layer including a plurality of liquid crystal molecules sandwiched between the first and second substrates; and polarizing plates attached to outer surfaces of the first substrate and the second substrate respectively;

wherein each of unit cells defined by the adjacent two bus lines of the plurality of bus lines and the adjacent two scanning lines of the plurality of gate lines is divided into a plurality of electric field forming regions; and wherein the electric field formed in each electric field forming regions is obliquely formed toward the data bus line and the gate bus line, thereby having a symmetry with adjacent electric field forming region.

There is also provided to a liquid crystal display, includes;

a first substrate comprising of a plurality of data bus lines which are parallel each other; a plurality of gate bus lines disposed parallel to form matrix type unit cells; a plurality of thin film transistors disposed at the intersections of the data bus lines and the gate bus lines, each disposed at each unit cell; and a pixel electrode connected to each of thin film transistor and a counter electrode are formed in each unit cells of the first substrate;

a second substrate oppositely disposed to the first substrate with a predetermined distance;

a liquid crystal layer including a plurality of liquid crystal molecules sandwiched between the first and second substrates;

homogeneous alignment layers formed over inner surfaces of the first and the second substrates, respectively; and polarizing plates attached to outer surfaces of the first substrate and the second substrate respectively;

wherein the counter electrode of the first substrate includes a first electrode of a rectangular frame type forming an opening region surrounded thereby; at least one second electrode which divides the opening region surrounded by the first electrode into a plurality of squared aperture space, the second electrode being parallel to the gate bus line; and a common signal line transmitting a common signal to the first electrode;

wherein the pixel electrode of the first substrate includes a first branch dividing the opening region surrounded by the first electrode to the direction parallel to the data bus line and a plurality of second branches which are crossed with the first branch to divide each of aperture spaces into four squared electric field forming regions; and wherein the electric field formed within the electric field forming region is disposed obliquely toward the gate bus line and the data bus line, thereby having a symmetry with adjacent electric field forming region.

There is further provided to a liquid crystal display, includes;

a first substrate comprising of a plurality of data bus lines which are parallel each other; a plurality of gate bus lines disposed parallel to form matrix type unit cells; a plurality of thin film transistors disposed at the intersections of the data bus lines and the gate bus lines, each disposed at each unit cell; and a pixel electrode connected to a thin film transistor and a counter electrode are formed in each of unit cells of the first substrate;

a second substrate oppositely disposed to the first substrate with a predetermined distance;

a liquid crystal layer including a plurality of liquid crystal molecules sandwiched between the first and second substrates;

a first homogeneous alignment layer formed over an inner surface of the first substrate and having a rubbing axis parallel to the gate bus line(or the data bus line);

a second homogeneous alignment layer formed over an inner surface of the second substrate and having a rubbing axis of 180 degrees with the rubbing axis of the first homogeneous alignment layer;

a first polarizing plate attached to an outer surface of the first substrate and having a polarizing axis parallel to the rubbing axis of the first homogeneous alignment layer; and a second polarizing plate attached to an outer surface of the second substrate and having a polarizing axis being crossed with the polarizing axis of the first polarizing axis, wherein the counter electrode of the first substrate includes a first electrode of a rectangular frame type forming an opening region surrounded thereby; at least one second electrode which divides the opening region surrounded by the first electrode into a plurality of squared aperture space, the second electrode being parallel to the gate bus line; and a common signal line transmitting a common signal to the first electrode;

wherein the pixel electrode of the first substrate includes a first branch dividing the opening region surrounded by the first electrode to the direction parallel to the data bus line and a plurality of second branches which are crossed with the first branch to divide each of aperture spaces into four squared electric field forming regions; and wherein the electric field formed within the electric field forming region is disposed obliquely toward the gate bus line and the data bus line, thereby having a symmetry with adjacent electric field forming region.

BRIEF DESCRIPTION OF THE INVENTION

DETAILED DESCRIPTION OF THE PREFERRED EMBODIMENT

Figure 1:
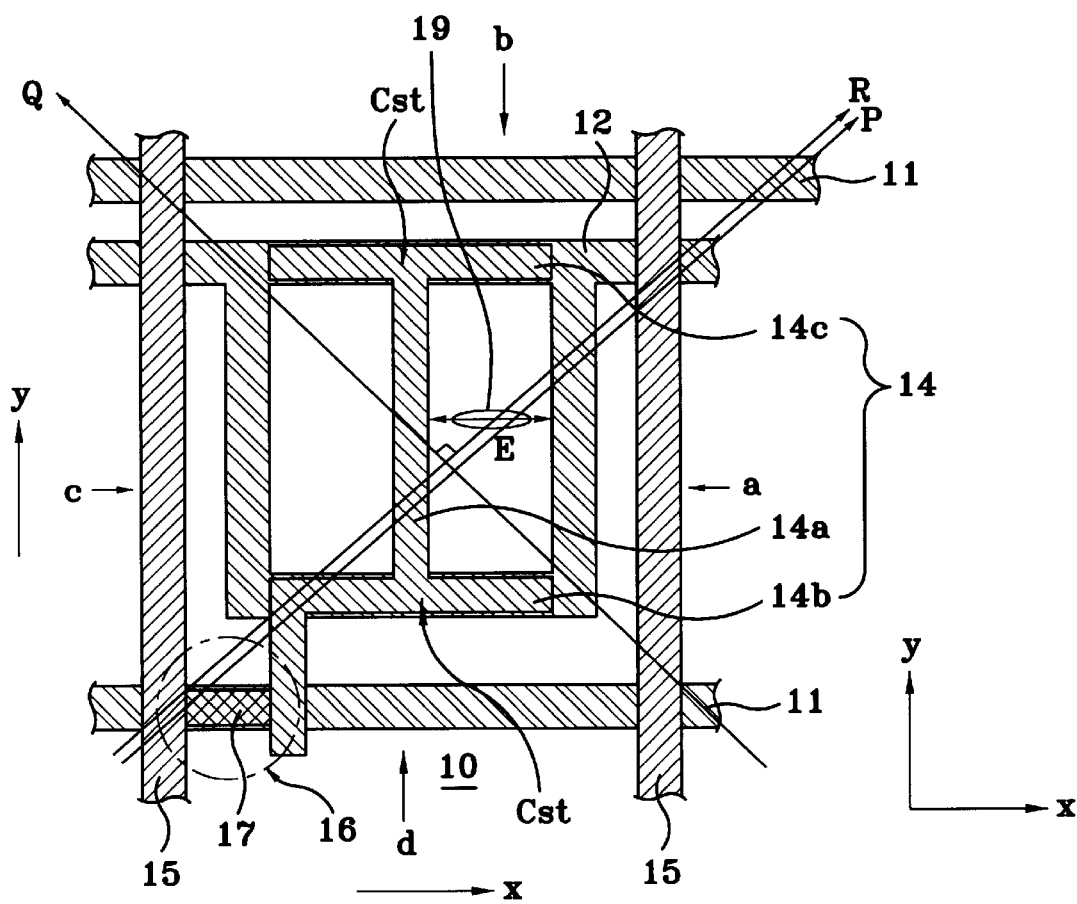
FIG. 1 is a plan view of lower substrate of prior art IPS-LCDs.
Figure 2:
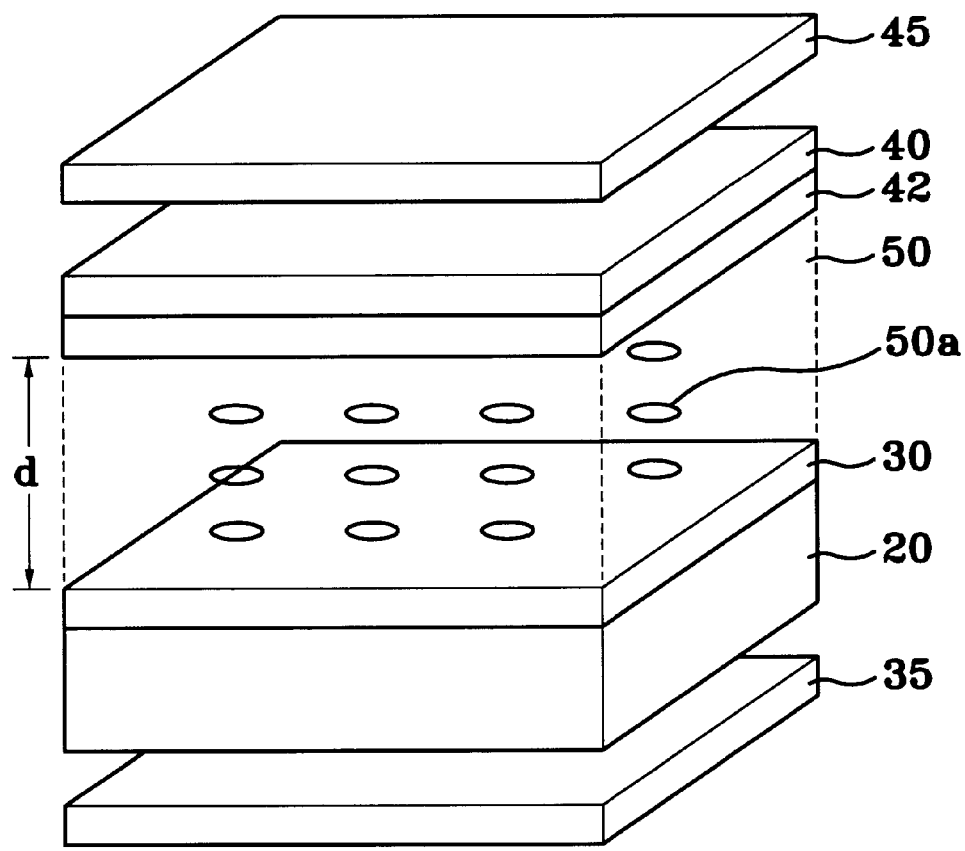
FIG. 2 is a perspective view of an LCD with horizontal electric field according to one embodiment of the present invention.
Figure 3:
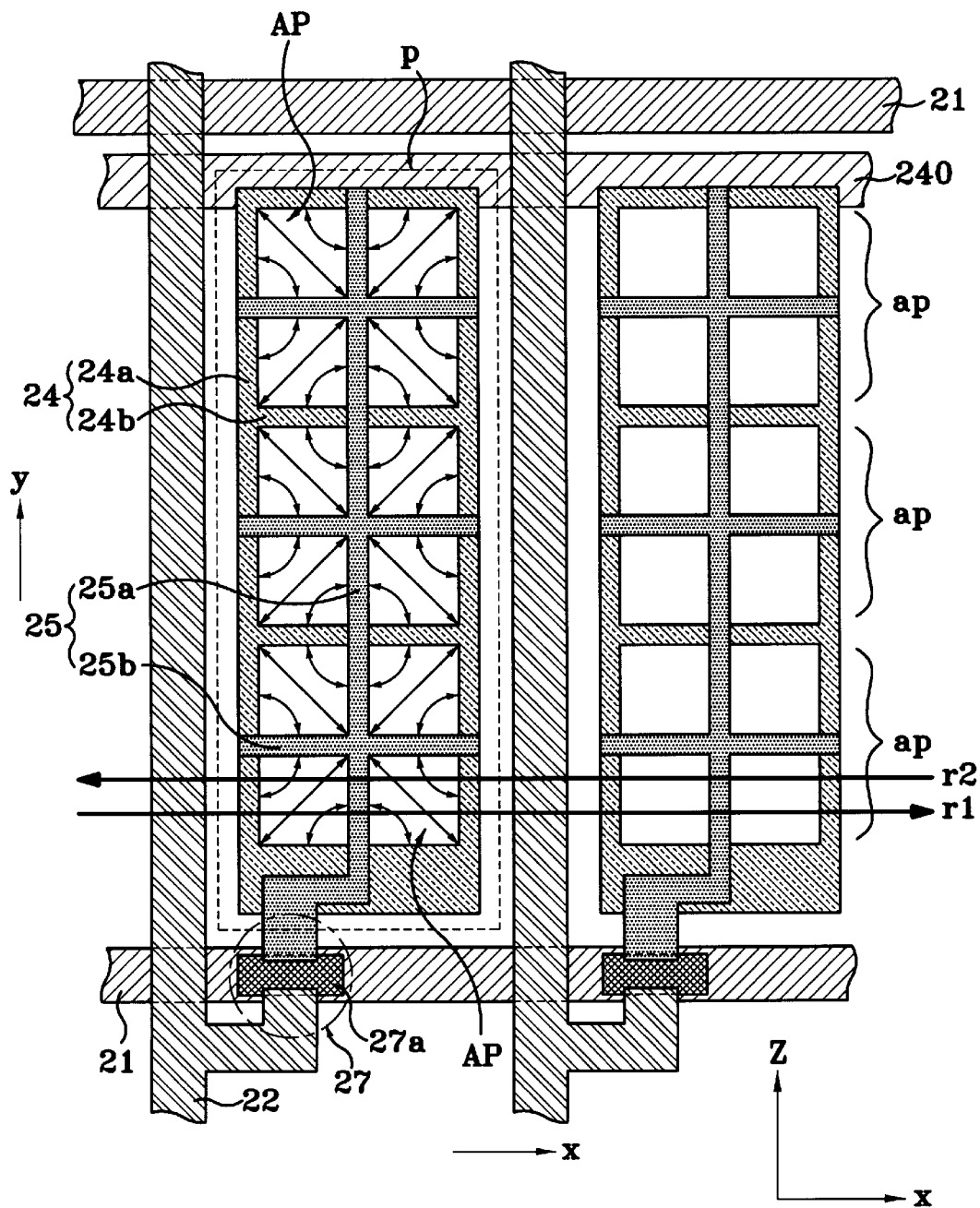
FIG. 3 is a plan view for showing the lower substrate according to the present invention.

Hereinafter a preferred embodiment of the present invention will be described in detail with reference to the attached drawings. Referring to FIG. 2 and FIG. 3, a lower substrate 20 and an upper substrate 40 are oppositely disposed each other with a predetermined distance "d" (hereinafter referenced as cell gap). The lower substrate 20 and the upper substrate 40 is a transparent insulating substrate and the cell gap is below 6 μm, preferably within the range of 4 to 4.5 μm. A liquid crystal layer 50 comprised of a plurality of liquid crystal molecules is sandwiched between the lower substrate 20 and the upper substrate 40. Herein, the liquid crystal molecules 50a within the liquid crystal layer 50 have the dielectric anisotropy Δε and the refraction anisotropy Δn. In the preferred embodiment, as the liquid crystal molecules, the material having any one of the positive or the negative dielectric anisotropy Δε and having only the positive refraction anisotropy may be selected. At this time the refraction anisotropy Δn is decided after considering the cell gap d, and the phase retardation which is a product of the dielectric anisotropy and the refraction anisotropy of the liquid crystal molecules should be limited under the range of 0.2 to 0.6 μm.

As shown in FIG. 3, a plurality of gate bus lines 21 extended toward a X direction and a plurality of data bus lines 22 extended toward a Y direction are formed to be crossed with over an inner surface of the lower substrate 20 to define sub pixels "p". In the drawing, only a couple of gate bus lines and a couple of data bus lines are shown. Herein, a gate insulating layer(not shown) insulates the gate bus line 21 and the data bus line 22. A counter electrode 24 is disposed at each of sub pixels "p" of the lower substrate 20. At this time, the counter electrode 24 includes a rectangular frame type first electrode 24a which is a similar figure of a reduced sub pixel p and at least a second electrode 24b which divides an opening region surrounded by the first electrode 24a into a plurality of square spaces. Wherein the square space defined by the first electrode 24a and the second electrode 24b is an aperture region "ap". In this embodiment, two second electrodes 24b make three aperture regions. Also, a common signal line 240 is in contact with a selected portion of the first electrode 24a of the counter electrode 24. Therefore the common signal is inputted to the counter electrode 24 through the common signal line 240.

Also a pixel electrode 24 is also disposed at each of sub pixels p of the lower substrate 20. The pixel electrode 25 includes a first branch 25a of Y direction which is a direction parallel to the data bus line 22 for dividing the aperture region "ap" into two parts, second branches 25b of X direction which is a direction parallel to the gate bus line 21, crossed with the first branch 25a. That is, the first branch 25a and the second branch 25b are arranged to divide one aperture region ap into a plurality of square frame type electric field forming regions "AP". In this embodiment, each aperture region "ap" is divided into four square frame type electric field forming regions "AP". Therefore the opening region surrounded by the first electrode 24a is divided into twelve square frame type electric field forming regions "AP" in accordance with the arrangement of the pixel electrode 25 and the counter electrode 24. The counter electrode 24 is partially overlapped with the pixel electrode 25 and a gate insulating layer(not shown) is interposed therebetween. Therefore, a storage capacitor is formed in the portion where the counter electrode 24 and the pixel electrode 25 are overlapped. A TFT 27 is provided at the intersection of the gate bus line 21 and the data bus line 22 as a switching device. Herein, the TFT 27 includes the gate bus line 21 being as a gate electrode, the drain electrode extended from the data bus line 22, a source electrode extended from the pixel electrode 25 and a channel layer 27a formed over the upper of the gate bus line 21.

The first alignment layer 30 and the second alignment layer 42 are formed on the inner surfaces of the lower substrate 20 and the upper substrate 40 respectively. The first alignment layer 30 and the second alignment layer 42 are homogeneous alignment layers having the pre-tilt angle of below 6 degrees. The rubbing axis r1 of the first alignment layer 30 formed on the lower substrate 20 is parallel to the X direction which is a direction parallel to the gate bus line or the Y direction which is a direction parallel to the data bus line. In this embodiment, the rubbing axis r1 of the first alignment layer 30 is the X direction. On the other hand, the rubbing axis r2 of the second alignment layer 42 formed on the upper substrate 40 has about 180 degree with the rubbing axis r1 of the first alignment layer 30. Furthermore, the first polarizing plate 35 is disposed in the outer surface of the lower substrate 20 and the second polarizing plate 45 is disposed in the outer surface of the upper substrate 40. The first polarizing plate 35 is arranged such that its polarizing axis is parallel to the rubbing axis r1 of the first alignment layer 30 and the second polarizing substrate 45 is arranges such that its polarizing axis is perpendicular to the polarizing axis of the first polarizing plate 35.

Hereinafter an operation of the LCD in accordance with the present invention. First of all, the long axes of liquid crystal molecules are parallel to the surfaces of the lower substrate 20 and the upper substrate 40 under the influence of the first alignment layer 30 and the second alignment layer 42 before an electric field is not formed between the counter electrode 24 and the pixel electrode 25. At this time, the long axes of the liquid crystal molecules 50a are parallel to the rubbing axis r1 of the first alignment layer 30. Consequently the light passed to the first polarizing plate 35 and the liquid crystal layer 50 does not change its polarizing state. Then, the light passed through the liquid crystal layer 50 is absorbed by the second polarizing plate 45 whose polarizing axis is perpendicular to the polarizing axis of the first polarizing plate 35 and the screen has dark state.

Figure 4:
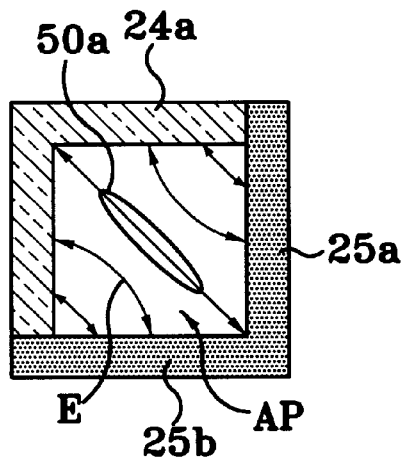
FIG. 4 is a plan view for showing the electric field forming region of FIG. 3.

On the other hand, the TFT 27 formed at the intersection of the gate bus line 21 and the data bus line 22 is turned on upon selecting the gate bus line 21 and inputting a display signal to the data bus line 22. Then, the display signal of data bus line 22 is transmitted to the pixel electrode 25. Accordingly an electric field E is formed between the pixel electrode 25 and the counter electrode 24 where the common signal is inputted. At this time, the electric field E as shown in FIG. 3 and FIG. 4 is formed in an oblique line within the squared electric field forming region AP. This type of electric field is called an effective field. The effective field also means an electric field formed between the adjoining electrodes. Namely as shown in FIG. 4, the effective field is formed in an orderly oblique line at the corner region made of the first electrode 24a of the counter electrode 24 and the first branch 25a or the second branch 25b of the pixel electrode 25. The effective field has 45 degrees with the Y direction (or the X direction) since the electric field forming region AP is of square. Accordingly, an LCD device has the maximum transmittance.

So as to obtain the maximum transmittance, the $\chi$ should be $\pi/4$(45 degrees) or the $\Delta nd/\lambda$ should be $\frac{1}{2}\pi$ according to the equation (1). In this embodiment, the $\Delta nd/\lambda$ is adjusted to $\frac{1}{2}\pi$ by selecting the kind of liquid crystal molecule and controlling the cell gap. Also with regard to the $\chi$, the counter electrode 24 and the pixel electrode 25 are designed such that the electric field direction has ±45 degree with the Y direction. Accordingly the maximum transmittance is obtained. Once the liquid crystal molecule 50a is arranged along the electric field E, the incident light from a backlight is linearly polarized by passing the polarizing axis of the first polarizing plate 35. Afterwards, the linearly polarized light has a predetermined angle with the optical axis of the liquid crystal molecules during its pass through the liquid crystal layer 50, therefore the polarizing state is changed. Then the screen is white state since the light having a changed polarizing state passes through the polarizing axis of the second polarizing plate 45. At this time, the polarizing axes of the first polarizing plate 35 and the second polarizing plate 45 have ±45 degrees with the long axis of the liquid crystal molecule 50 respectively so that the maximum transmittance is obtained.

Figure 5:
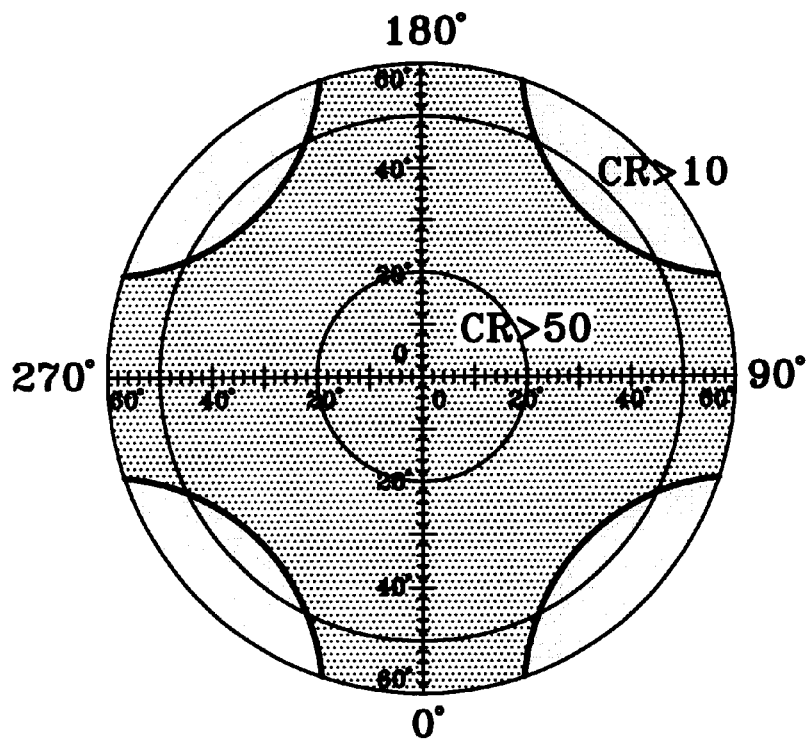
FIG. 5 illustrates a curve showing the contrast ratio depending on LCD viewing angles according to one embodiment of the present invention.

Furthermore, according to the above arrangement of the electrodes 24 and 25, an electric field having four symmetrical oblique directions is formed at each electric field forming region "AP". And the liquid crystal molecules are separated into four groups within the aperture space "ap". Accordingly, there are four domains of liquid crystal molecules in the sub pixel p. Hence, both long axis and the short axis are simultaneously observed from whatever azimuth angle while in the white state. The refractive anisotropy of liquid crystal molecule is compensated, therefore a color shift is not occurred. FIG. 5 shows the contrast ratio according to the LCD viewing angle of the present invention. Since the liquid crystal molecules are operated by the horizontal field, the contrast ratio CR is over 50 at most of the azimuth angles and the region having the contrast ratio of over 50 has mirror plane symmetries. Also the viewing angle characteristics are greatly enhanced at the direction identical to the polarizing axis, namely degrees of 0, 90, 180, and 270.

As described above, an electric field having an oblique line, more preferably a diagonal line towards the polarizing axis within a sub pixel is formed so as to form a multi-domain of liquid crystal molecules. Therefore the color shift of IPS-LCD devices is improved.

Furthermore, the viewing angle characteristics are enhanced since the liquid crystal molecules are driven by the in-plane field. Particularly since the polarizing axes of the polarizing plates are taking the direction of 0(180 degrees) and 90(270 degrees) at the azimuth angles of degrees 0, 90, 180, and 270, the viewing angle characteristics are greatly enhanced.

Various changes and modifications can be made without departing from the spirit and scope of the invention as defined by the following claims.

We claim:
1. A liquid crystal display device with a horizontal electric field, said liquid crystal display device comprising:
   a first substrate comprising a plurality of data bus lines which are parallel to each other; a plurality of gate bus lines disposed parallel to form matrix type unit cells; a plurality of thin film transistors disposed at the intersections of the data bus lines and the gate bus lines, each disposed at each unit cell; a pixel electrode connected to each of the thin film transistors and a counter electrode are formed in each of the unit cells of the first substrate;
   a second substrate oppositely disposed to the first substrate with a predetermined distance;
   a liquid crystal layer including a plurality of liquid crystal a liquid crystal layer including a plurality of liquid crystal molecules sandwiched between the first and second substrates; and
   polarizing plates attached to outer surfaces of the first substrate and the second substrate respectively;
   wherein each of the unit cells defined by the adjacent two bus lines of the plurality of bus lines and the adjacent two scanning lines of the plurality of gate lines is divided into a plurality of electric field forming regions; and
   wherein the electric field formed in each electric field forming region is obliquely formed toward the data bus line and the gate bus line, and an electric field formed in a selected electric field forming region forms a symmetry, in the up, down, left, and right directions respectively, with electric fields formed in adjacent electric field forming regions.

2. The liquid crystal display device as claimed in claim 1, wherein the liquid crystal molecules are arranged such that the long axis thereof is parallel to the surface of the first substrate to the gate bus line, in case no electric field is formed between the counter electrode and the pixel electrode.

3. The liquid crystal display device as claimed in claim 2, wherein a polarizing axis of the polarizing plate attached to the outer surface of the first substrate is parallel to the gate bus line, and a polarizing axis of the polarizing plate attached to the outer surface of the second substrate is crossed with the polarizing axis of the first substrate.

4. The liquid crystal display device as claimed in claim 1, wherein the liquid crystal molecules are arranged such that the long axis thereof is parallel to the surface of the first substrate and to the data bus line, in case no electric field is formed between the counter electrode and the pixel electrode.

5. The liquid crystal display device as claimed in claim 4, wherein a polarizing axis of the polarizing plate attached to the outer surface of the first substrate is parallel to the data bus line, and a polarizing axis of the polarizing plate attached to the outer surface of the second substrate is crossed with the polarizing axis of the first substrate.

6. A liquid crystal display device with horizontal electric field comprising;
   a first substrate comprising of a plurality of data bus lines which are parallel each other; a plurality of gate bus lines disposed parallel to form matrix type unit cells; a plurality of thin film transistors disposed at the intersections of the data bus lines and the gate bus lines, each disposed at each unit cell; and a pixel electrode connected to each of thin film transistor and a counter electrode are formed in each unit cells of the first substrate;

a second substrate oppositely disposed to the first substrate with a predetermined distance;

a liquid crystal layer including a plurality of liquid crystal molecules sandwiched between the first and second substrates;

homogeneous alignment layers formed over inner surfaces of the first and the second substrates, respectively; and polarizing plates attached to outer surfaces of the first substrate and the second substrate respectively;

wherein the counter electrode of the first substrate includes a first electrode of a rectangular frame type forming an opening region surrounded thereby; at least one second electrode which divides the opening region surrounded by the first electrode into a plurality of squared aperture space, the second electrode being parallel to the gate bus line; and a common signal line transmitting a common signal to the first electrode;

wherein the pixel electrode of the first substrate includes a first branch dividing the opening region surrounded by the first electrode to the direction parallel to the data bus line and a plurality of second branches which are crossed with the first branch to divide each of aperture spaces into four squared electric field forming regions; and wherein the electric field formed within the electric field forming region is disposed obliquely toward the gate bus line and the data bus line, thereby having a symmetry with adjacent electric field forming region.

7. The liquid crystal display device as claimed in claim 6, wherein the homogeneous alignment layer of the first substrate includes a rubbing axis parallel to the gate bus line, and the homogeneous alignment layer of the second substrate includes a rubbing axis having 180 degrees with the rubbing axis of the homogeneous alignment layer of the first substrate.

8. The liquid crystal display device as claimed in claim 7, wherein the polarizing plate attached to the outer surface of the first substrate is disposed to be parallel to the rubbing axis of homogeneous alignment layer of the first substrate, and the polarizing plate attached to the outer surface of the second substrate is disposed such that the polarizing axis thereof is crossing with the polarizing axis attached to the outer surface of the first substrate.

9. The liquid crystal display device as claimed in claim 6, wherein the homogeneous alignment layer of the first substrate includes a rubbing axis parallel to the data bus line, and the homogeneous alignment layer of the second substrate includes a rubbing axis having 180 degrees with the rubbing axis of the first substrate.

10. The liquid crystal display device as claimed in claim 9, wherein the polarizing plate attached to the outer surface of the first substrate is disposed to be parallel to the rubbing axis of homogeneous alignment layer of the first substrate, and the polarizing plate attached to the outer surface of the second substrate is disposed such that the polarizing axis thereof is crossing with the polarizing axis attached to the outer surface of the first substrate.

11. The liquid crystal display as claimed in claim 6, wherein the first electrode of the counter electrode is a similar figure of a reduced sub pixel of square frame type.

12. The liquid crystal display as claimed in claim 6, wherein the product of the thickness of liquid crystal layer and the birefringence of liquid crystal molecules is in the range of 0.2 $\mu$m to 0.6 $\mu$m.

13. The liquid crystal display with horizontal electric field comprising;

a first substrate comprising of a plurality of data bus lines which are parallel each other; a plurality of gate bus lines disposed parallel to form matrix type unit cells; a plurality of thin film transistors disposed at the intersections of the data bus lines and the gate bus lines, each disposed at each unit cell; and a pixel electrode connected to a thin film transistor and a counter electrode are formed in each of unit cells of the first substrate;

a second substrate oppositely disposed to the first substrate with a predetermined distance;

a liquid crystal layer including a plurality of liquid crystal molecules sandwiched between the first and second substrates;

a first homogeneous alignment layer formed over an inner surface of the first substrate and having a rubbing axis parallel to the gate bus line(or the data bus line);

a second homogeneous alignment layer formed over an inner surface of the second substrate and having a rubbing axis of 180 degrees with the rubbing axis of the first homogeneous alignment layer;

a first polarizing plate attached to an outer surface of the first substrate and having a polarizing axis parallel to the rubbing axis of the first homogeneous alignment layer; and a second polarizing plate attached to an outer surface of the second substrate and having a polarizing axis being crossed with the polarizing axis of the first polarizing axis, wherein the counter electrode of the first substrate includes a first electrode of a rectangular frame type forming an opening region surrounded thereby; at least one second electrode which divides the opening region surrounded by the first electrode into a plurality of squared aperture space, the second electrode being parallel to the gate bus line; and a common signal line transmitting a common signal to the first electrode;

wherein the pixel electrode of the first substrate includes a first branch dividing the opening region surrounded by the first electrode to the direction parallel to the data bus line and a plurality of second branches which are crossed with the first branch to divide each of aperture spaces into four squared electric field forming regions; and wherein the electric field formed within the electric field forming region is disposed obliquely toward the gate bus line and the data bus line, thereby having a symmetry with adjacent electric field forming region.

14. The liquid crystal display as claimed in claim 13, wherein the product of thickness of the liquid crystal layer and the birefringence of liquid crystal molecules is in the range of 0.2 $\mu$m to 0.6 $\mu$m.

* * * * *